(12) United States Patent
Yang et al.

(10) Patent No.: US 8,884,998 B2
(45) Date of Patent: Nov. 11, 2014

(54) DISPLAY

(75) Inventors: Yingbao Yang, Kanagawa (JP); Goro Hamagishi, Kanagawa (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 129 days.

(21) Appl. No.: 13/533,515

(22) Filed: Jun. 26, 2012

(65) Prior Publication Data

US 2013/0162691 A1    Jun. 27, 2013

(30) Foreign Application Priority Data

Jul. 1, 2011    (JP) ................................. 2011-147210

(51) Int. Cl.
*G09G 5/10* (2006.01)
*H04N 13/04* (2006.01)
*G02B 27/22* (2006.01)

(52) U.S. Cl.
CPC .............. *G09G 5/10* (2013.01); *H04N 13/0477* (2013.01); *H04N 13/0409* (2013.01); *H04N 13/0447* (2013.01); *G02B 27/2214* (2013.01); *H04N 13/0497* (2013.01); *H04N 13/0475* (2013.01); *H04N 2213/002* (2013.01)
USPC ................................. 345/690; 348/42; 348/46

(58) Field of Classification Search
USPC .................................................. 345/694, 697
See application file for complete search history.

(56) References Cited

U.S. PATENT DOCUMENTS

| | | | | |
|---|---|---|---|---|
| 5,528,420 A | * | 6/1996 | Momochi | 359/463 |
| 5,870,505 A | * | 2/1999 | Wober et al. | 382/274 |
| 6,302,541 B1 | * | 10/2001 | Grossmann | 351/240 |
| 6,307,585 B1 | | 10/2001 | Hentschke | |
| 6,791,570 B1 | * | 9/2004 | Schwerdtner et al. | 345/613 |
| 6,801,220 B2 | * | 10/2004 | Greier et al. | 345/694 |
| 7,242,432 B2 | * | 7/2007 | Watanabe | 348/333.11 |

(Continued)

FOREIGN PATENT DOCUMENTS

| | | |
|---|---|---|
| GB | 2 296 617 | 7/1996 |
| JP | 09-160144 | 6/1997 |

(Continued)

OTHER PUBLICATIONS

Extended European Search Report dated Oct. 9, 2013 in corresponding European Application No. 12172717.6.

(Continued)

*Primary Examiner* — Amr Awad
*Assistant Examiner* — Wing Chow
(74) *Attorney, Agent, or Firm* — K&L Gates LLP

(57) ABSTRACT

A display includes: a display section that includes first pixels to nth pixels and displays perspective images assigned to the first to nth pixels; and a display control section that partitions the display section into sub-regions and performs display control on pixels in each of the sub-regions, independently, to vary a correspondence relationship between the first to nth pixels and the perspective images for each of the sub-regions. The display control section assigns a first perspective image to two pixels of the first pixel to the nth pixel and assigns a second perspective image to other two pixels of the first pixel to the nth pixel, in each of the sub-regions. The display control section adjusts a luminance level of one or both of the two pixels and a luminance level of one or both of the other two pixels in each of the sub-regions.

9 Claims, 19 Drawing Sheets

(56) References Cited

U.S. PATENT DOCUMENTS

| | | | |
|---|---|---|---|
| 8,368,727 B2* | 2/2013 | Smith et al. | 345/690 |
| 8,441,522 B2* | 5/2013 | De La Barre et al. | 348/51 |
| 8,537,205 B2* | 9/2013 | Yamauchi et al. | 348/51 |
| 2013/0187961 A1* | 7/2013 | Hunt | 345/697 |

FOREIGN PATENT DOCUMENTS

| | | |
|---|---|---|
| JP | 10-282453 | 10/1998 |
| JP | 2002-519897 | 7/2002 |
| JP | 2008-185629 | 8/2008 |
| JP | 2009-080144 | 4/2009 |
| JP | 2090-080144 | 4/2009 |
| WO | 98/53616 | 11/1998 |
| WO | 2007/043988 | 4/2007 |

OTHER PUBLICATIONS

Woodgate et al., Autostereoscopic 3D display systems with observer tracking, Signal Processing: Image Communication 14 (1998) 131-145.

Japanese Office Action issued Apr. 8, 2014 in corresponding Japanese Patent Application No. 2011-147210.

* cited by examiner

DISPLAY

CROSS REFERENCES TO RELATED APPLICATIONS

The present application claims priority to Japanese Priority Patent Application JP 2011-147210 filed in the Japan Patent Office on Jul. 1, 2011, the entire content of which is hereby incorporated by reference.

BACKGROUND

The present application relates to a display performing stereoscopic display by a naked-eye system with use of a parallax separation structure such as a parallax barrier.

Techniques of performing stereoscopic display include a glass system with use of glasses for stereoscopic vision and a naked-eye system capable of achieving stereoscopic vision by naked eyes without glasses for stereoscopic vision. A typical glass system is a shatter glass system using shutter glasses with a left-eye shutter and a right-eye shutter. In the shutter glass system, a left-eye parallax image and a right-eye parallax image are alternately displayed on a two-dimensional display panel at high speed in a frame-sequential manner. Then, the left-eye shutter and the right-eye shutter are alternately opened and closed in synchronization with switching of the parallax images to allow only the left-eye parallax image and the right-eye parallax image to enter a left eye and a right eye of a viewer, respectively, thereby achieving stereoscopic vision.

On the other hand, typical naked-eye systems include a parallax barrier system and a lenticular lens system. In the parallax barrier system and the lenticular lens system, parallax images for stereoscopic vision (a right-eye parallax image and a left-eye parallax image in the case of two perspectives) which are spatially separated from one another are displayed on a two-dimensional display panel, and the parallax images are separated by parallax in a horizontal direction by a parallax separation structure to achieve stereoscopic vision. In the parallax barrier system, as the parallax separation structure, a parallax barrier having slit-like openings is used. In the lenticular system, as the parallax separation structure, a lenticular lens including a plurality of cylindrical split lenses arranged side-by-side is used.

SUMMARY

In a naked-eye system using a parallax separation structure, there is an issue that when a view position of a viewer is out of a predetermined design region, proper stereoscopic vision is not achievable. Moreover, Japanese Unexamined Patent Application Publication No. H09-50019 discloses a display capable of reducing a preferred viewing distance in design; however, a too short preferred viewing distance may cause a too narrow space between a parallax separation structure and a display section displaying an image, thereby causing difficulty in manufacturing.

It is desirable to provide a display capable of performing optimum stereoscopic display according to a view position.

According to an embodiment of the application, there is provided a display including: a display section including a plurality of first pixels to a plurality of nth pixels, where n is an integer of 4 or more, and displaying a plurality of perspective images assigned to the first to nth pixels; and a display control section partitioning the display section into a plurality of sub-regions and performing display control on pixels in each of the sub-regions, independently, thereby to vary a correspondence relationship between the first to nth pixels and the perspective images for each of the sub-regions. The display control section assigns a first perspective image to two pixels of the first pixel to the nth pixel and assigns a second perspective image to other two pixels of the first pixel to the nth pixel, in each of the sub-regions, and the display control section adjusts a luminance level of one or both of the two pixels and a luminance level of one or both of the other two pixels in each of the sub-regions.

In the display according to the embodiment of the application, control is performed to vary the correspondence relationship between the first to nth pixels and the perspective images for each of the sub-regions. Moreover, the luminance level of one or both of the two pixels and the luminance level of one or both of the other two pixels are adjusted in each of the sub-regions.

In the display according to the embodiment of the application, the display control is performed on pixels of the display section in each of the sub-regions, independently, thereby to vary the correspondence relationship between the first to nth pixels and the perspective images for each of the sub-regions, and the luminance level of one or both of the two pixels and the luminance level of one or both of the other two pixels are adjusted in each of the sub-regions. Therefore, optimum stereoscopic display according to a view position is allowed to be performed.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

DETAILED DESCRIPTION

A preferred embodiment of the present application will be described in detail referring to the accompanying drawings.

[Whole Configuration of Display]

Figure 1:
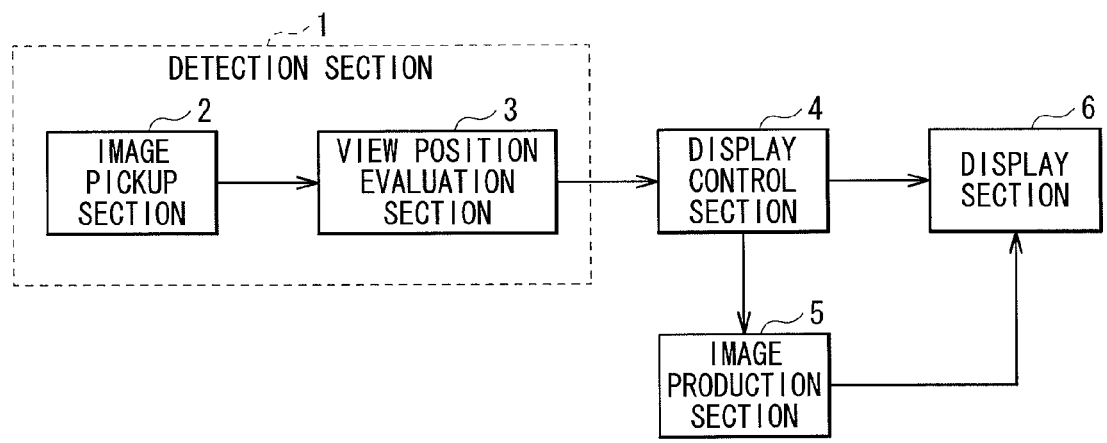
FIG. 1 is a block diagram illustrating an example of a whole configuration of a display according to an embodiment of the application.

FIG. 1 illustrates a configuration example of a display according to an embodiment of the application. The display includes a detection section 1, a display control section 4, an image production section 5, and a display section 6. The detection section 1 includes an image pickup section 2 and a view position evaluation section 3.

The display section 6 is configured of a two-dimensional display such as a liquid crystal display panel, an electroluminescence display panel, or a plasma display. A plurality of pixels are two-dimensionally arranged on a display screen of the display section 6. Images are displayed on the display screen of the display section 6 according to a stereoscopic display system of the display. First to nth (where n is an integer of 4 or more) numbers corresponding to first to nth perspectives, respectively, in stereoscopic display are assigned to the plurality of pixels (or sub-pixels) of the display section 6.

The display performs stereoscopic display by a naked-eye system, and the stereoscopic display system is a system using a parallax separation structure such as a parallax barrier system or a lenticular lens system. In the case of the lenticular lens system, as the parallax separation structure, for example, a lenticular lens including a plurality of cylindrical split lenses arranged side-by-side is used. A parallax composite image created by combining parallax images (perspective images) corresponding to a plurality of perspectives in one screen is displayed on the display section 6. In other words, a plurality of perspective images are spatially separated and displayed. As will be described later, the display varies the number of perspective images displayed on the display section 6 according to a view position of a viewer. For example, in the case where the view position of the viewer is located at a first distance Z0/2 (refer to FIG. 9 or the like which will be described later), a left-eye image and a right-eye image which are parallax images corresponding to two perspectives, i.e., left and right perspectives are displayed as the plurality of perspective images. Moreover, for example, in the case where the view position of the viewer is located at a second distance Z0 which is a normal preferred viewing distance, parallax images corresponding to a plurality of perspectives, for example, first to fourth perspective images are displayed as the plurality of perspective images (refer to FIG. 2 or the like which will be described later).

Figure 2:
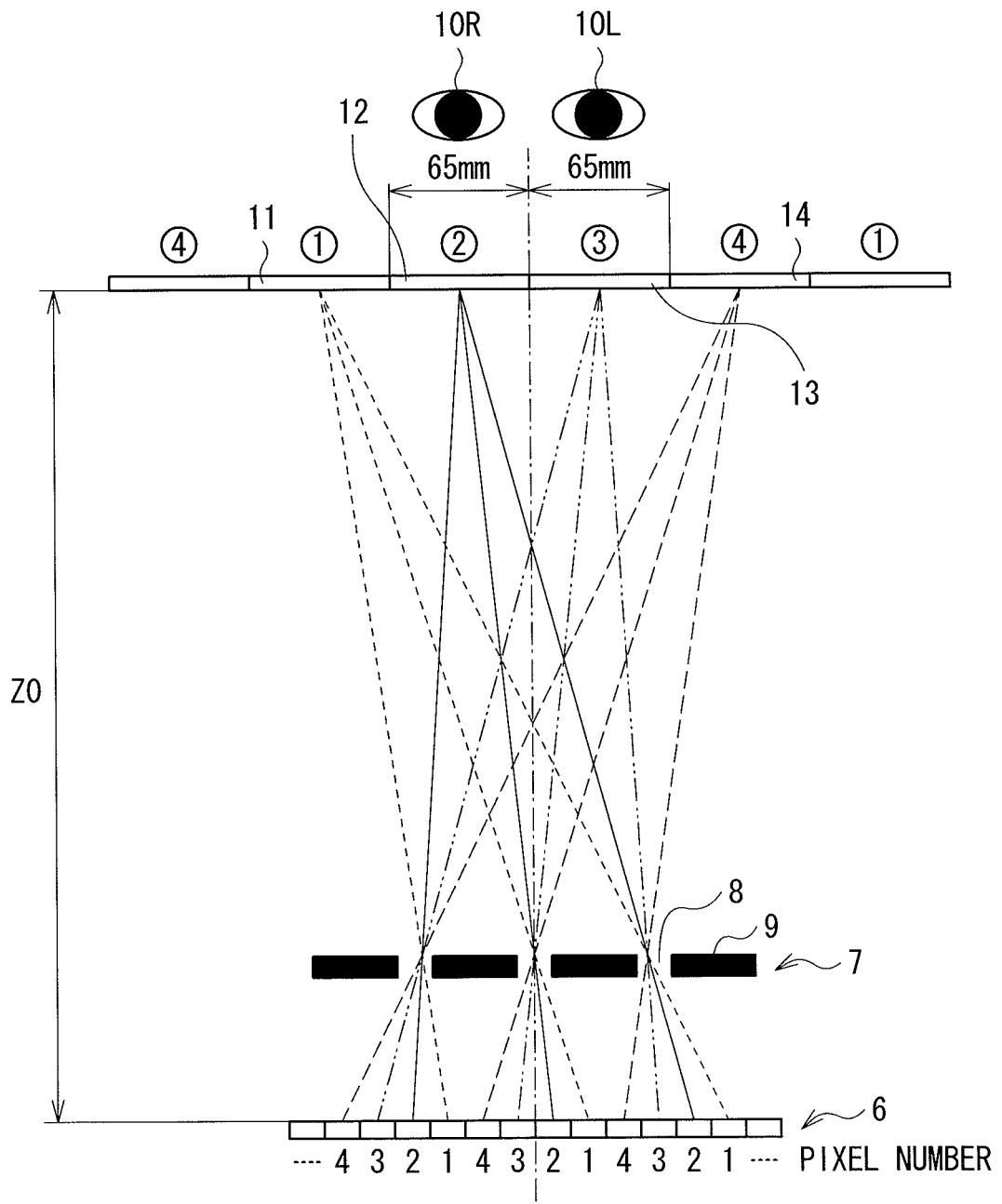
FIG. 2 is a sectional view illustrating a configuration example in the case where stereoscopic display with four perspectives is performed in the display illustrated in FIG. 1.

In the embodiment, the case where stereoscopic display by the parallax barrier system is performed will be described below as an example. In the case of the parallax barrier system, for example, as illustrated in FIG. 2, a barrier device 7 is used as the parallax separation structure. The barrier device 7 has opening sections 8 allowing light to pass therethrough and shielding sections 9 shielding light. The barrier device 7 may be a fixed parallax barrier or a variable parallax barrier. In the case of the fixed parallax barrier, for example, a parallax barrier formed by forming a pattern including the opening sections 8 and the shielding sections 9 with use of metal in a thin-film shape on a surface of a transparent plane parallel plate (base) is allowed to be used. In the case of the variable parallax barrier, for example, patterns of the opening sections 8 and the shielding sections 9 are allowed to be selectively formed with use of, for example, a display function (a light modulation function) by backlight system liquid crystal display devices. It is to be noted that FIG. 2 illustrates an example in which the barrier device 7 is disposed on a display plane of the display section 6; however, the barrier device 7 may be disposed on a back plane of the display section 6. For example, in the case where a backlight system liquid crystal display panel is used as the display section 6, the barrier device 7 may be disposed on a back plane of the liquid crystal display panel between a backlight and the liquid crystal display panel.

The image pickup section 2 takes an image of a viewer. The view position evaluation section 3 evaluates the view position of the viewer (evaluates the viewing distance from the display section 6 and a position in an in-plane direction parallel to the display plane) by analyzing the image taken by the image pickup section 2. The view position is allowed to be detected by the detection section 1 with use of, for example, a face tracking technique. It is to be noted that the viewing distance is typically a distance from the display plane of the display section 6 to a central position between both eyes of the viewer.

The display control section 4 controls an image to be displayed on the display section 6 according to the view position of the viewer detected by the detection section 1. As will be described later, in the case where the view position of the viewer is located at the first distance Z0/2 from the display section 6, the display control section 4 performs display control on pixels in each of a plurality of sub-regions 31 (refer to FIG. 11 or the like which will be described later) of the display section 6, independently, thereby to vary a correspondence relationship between the first to nth pixels and the perspective images (a left-eye image and a right-eye image) for each of the sub-regions 31. As will be described later, in the case where the view position of the viewer is located at the second distance Z0, the display control section 4 assigns the first to nth perspective images as a plurality of perspective images to the first to nth pixels in an entire screen.

The image production section 5 produces, in response to control by the display control section 4, image data including a plurality of perspective images that are based on the view position of the viewer to supply the image data to the display section 6. The display control section 4 allows the display section 6 to display the image data produced by the image production section 5.

[Principle of Stereoscopic Display at Normal Preferred Viewing Distance (Second Distance Z0)]

FIG. 2 illustrates a principle in the case where stereoscopic display with four perspectives is performed in the display. A display principle in the example in FIG. 2 is basically similar to a principle of stereoscopic display with four perspectives by a parallax barrier system in related art. First to fourth numbers corresponding to four perspectives are assigned to a plurality of pixels (or sub-pixels) of the display section 6. The display control section 4 assigns first to fourth perspective images as a plurality of perspective images to the first to fourth pixels, respectively, in the entire screen of the display section 6. Light beams from the first to fourth pixels of the display section 6 are separated by the opening sections 8 of the barrier device 7. The separated light beams reach first to fourth light-convergence regions 11 to 14 located at the second distance Z0, respectively. In other words, for example, all light beams from the first pixels in the entire screen reach the first light-convergence region 11 located at the second distance Z0 by a separation function of the barrier device 7. Likewise, all light beams from the second to fourth pixels in the entire screen reach respective light-convergence regions to which corresponding numbers are assigned.

The width of each of the first to fourth light-convergence regions 11 to 14 is equal to a pupillary distance E (typically 65 mm) Therefore, a right eye 10R and a left eye 10L of the viewer are located in different light-convergence regions, and view different perspective images to achieve stereoscopic vision. For example, in the example in FIG. 2, the right eye 10R of the viewer is located in the second light-convergence region 12, and the left eye 10L of the viewer is located in the third light-convergence region 13. In this case, stereoscopic vision is achieved with an image (the second perspective image) created by light from the second pixels and an image (the third perspective image) created by light from the third pixels. In the case where the view position is moved in a horizontal direction, different perspective images corresponding to the moved position are viewed to achieve stereoscopic vision.

Figure 3:
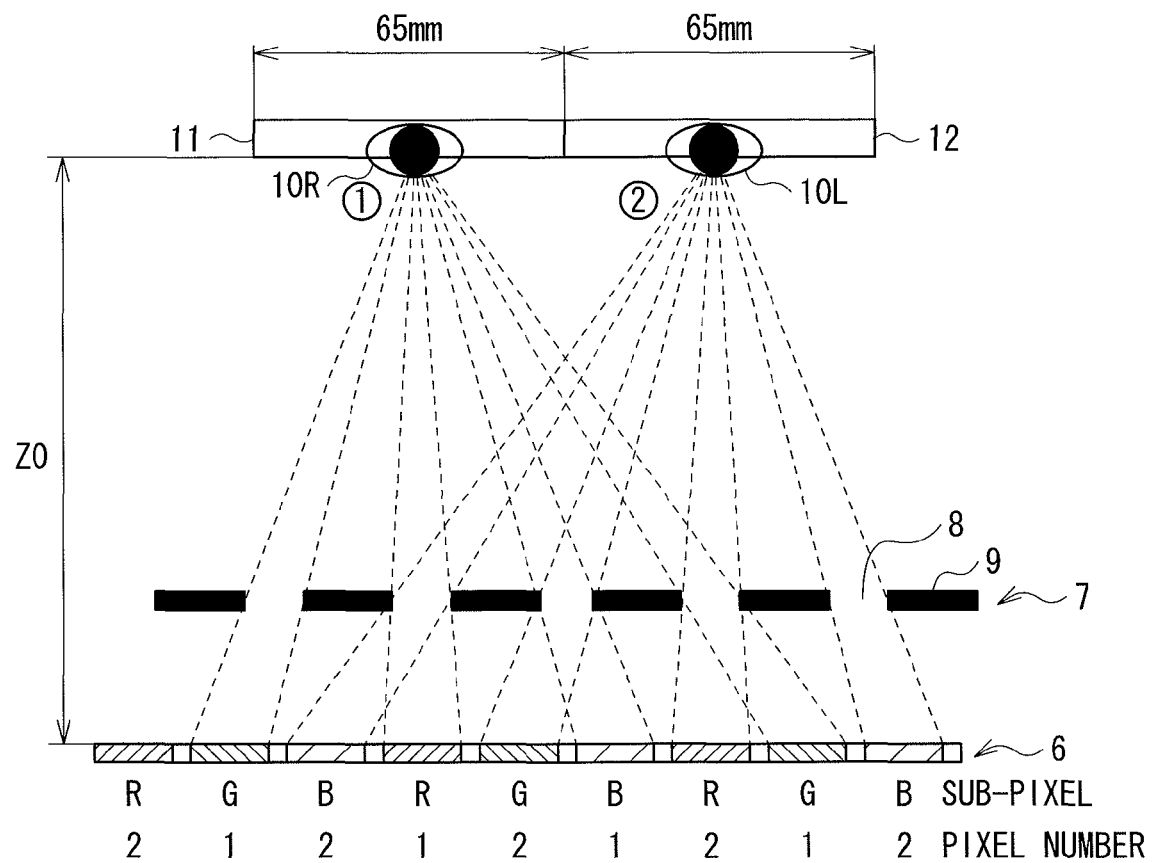
FIG. 3 is a sectional view illustrating a reference example in the case where stereoscopic display with two perspectives is performed.

FIG. 3 illustrates a principle in the case where stereoscopic display with two perspectives is performed by a related-art system as a reference example in comparison with FIG. 2. The principle is basically the same as that in the case of stereoscopic display with four perspectives illustrated in FIG. 2, except that the number of perspectives is two. In the display section 6, as a plurality of pixels, sub-pixels of RGB are alternately arranged, and first and second numbers are assigned to respective sub-pixels. A first perspective image (a right-eye image) and a second perspective image (a left-eye image) are assigned to the first sub-pixels and the second sub-pixels, respectively, in the entire screen of the display section 6, and the first and second perspective images are displayed. Light beams from the first sub-pixels and the second sub-pixels in the display section 6 are separated by the opening sections 8 of the barrier device 7. The separated light beams reach the first and second light-convergence regions 11 and 12 located at the second distance Z0, respectively. In other words, all light beams from the first pixels in the entire screen reach the first light-convergence region 11 located at the second distance Z0 by the separation function of the barrier device 7. Likewise, all light beams from the second pixels in the entire screen reach the second light-convergence region 12 located at the second distance Z0. The width of each of the first and second light-convergence regions 11 and 12 is equal to the pupillary distance E (typically 65 mm) Therefore, the right eye 10R and the left eye 10L of the viewer are located in different light-convergence regions, and view different perspective images to achieve stereoscopic vision.

[Normal Preferred Viewing Distance (Second Distance Z0) in Design]

Figure 4:
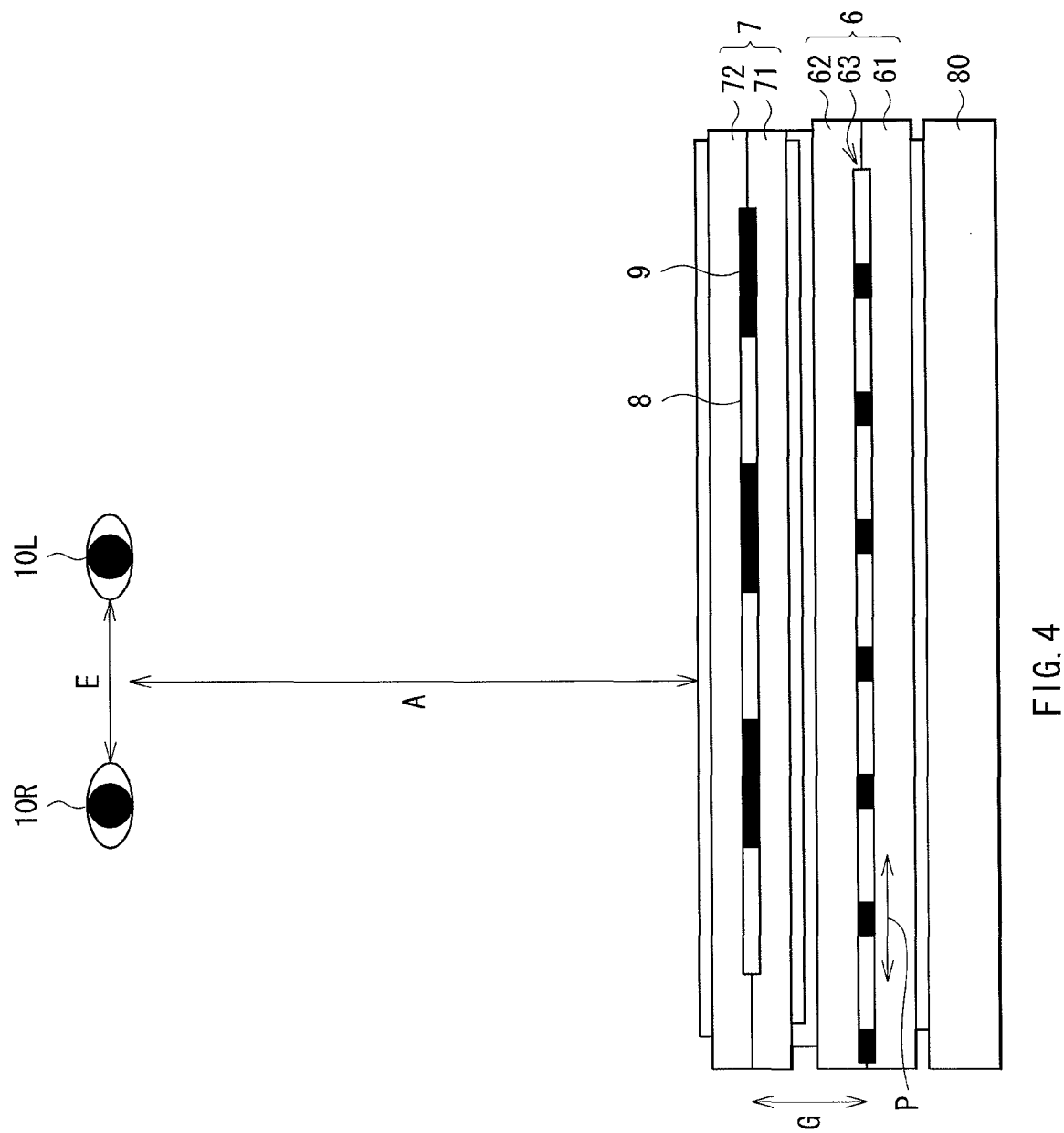
FIG. 4 is an explanatory diagram of a preferred viewing distance.

Referring to FIG. 4, a preferred viewing distance (the second distance Z0) in design in the case where stereoscopic display based on the display principle illustrated in FIGS. 2 and 3 is performed will be described below. In an example illustrated in FIG. 4, the display section 6 is, for example, a backlight system liquid crystal display panel, and a backlight 80 is disposed on the back plane of the display section 6. The display section 6 includes a first transparent substrate 61 and a second transparent substrate 62 which face each other, and includes a pixel section 63 between the substrates 61 and 62. The barrier device 7 is, for example, a transmissive type variable parallax barrier device, and includes a first transparent substrate 71 and a second transparent substrate 72 which face each other, and has opening sections 8 and shielding sections 9 between the substrates 71 and 72. In addition, the display section 6 and the barrier device 7 each include such as a polarizing plate and an adhesive layer on both surfaces or one surface thereof.

In FIG. 4, the pupillary distance is E, a pitch between pixels (or sub-pixels) in the display section 6 is P. A gap between the pixel section 63 of the display section 6 and the opening sections 8 of the barrier device 7 and between the pixel section 63 and the shielding sections 9 thereof is G. Moreover, a refractive index of a substrate or the like disposed between the pixel section 63 and the opening sections 8 and between the pixel section 63 and the shielding sections 9 is n. A distance from a central portion of a surface of the barrier device 7 to a central position between the left eye 10L and the right eye 10R of the viewer is A. In this case, the following relational expression is established in design. In the case where stereoscopic display is performed based on the display principle illustrated in FIGS. 2 and 3, the normal preferred viewing distance (the second distance Z0) in design has a value according to the following relational expression.

$$A:E=G/n:P$$

[Relationship Between View Position and Pixel to be Viewed]

Figure 5:
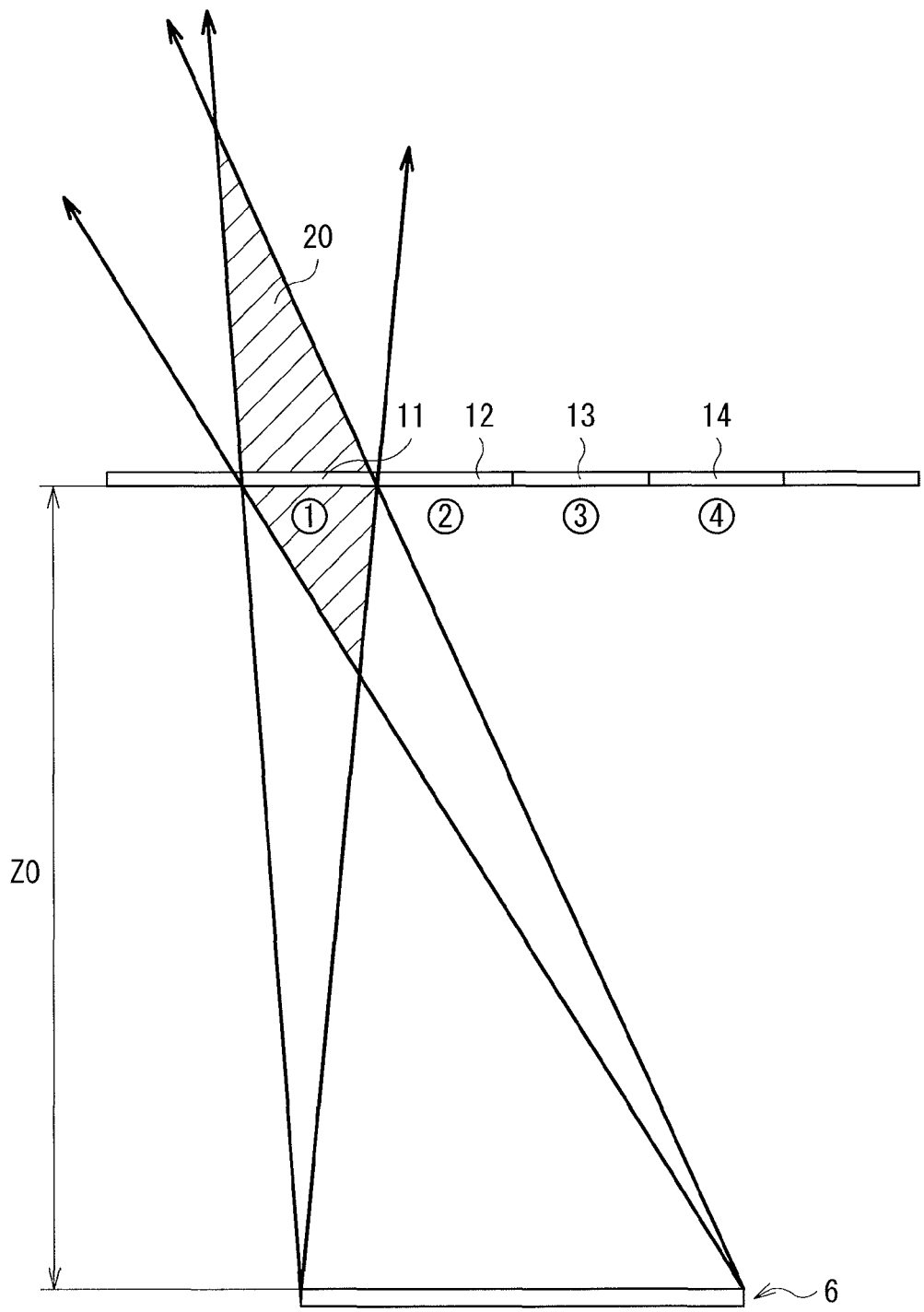
FIG. 5 is an explanatory diagram of viewable pixels in the case where a view position of a viewer is located in a first light-convergence region when stereoscopic display with four perspectives illustrated in FIG. 2 is performed.
Figure 6:
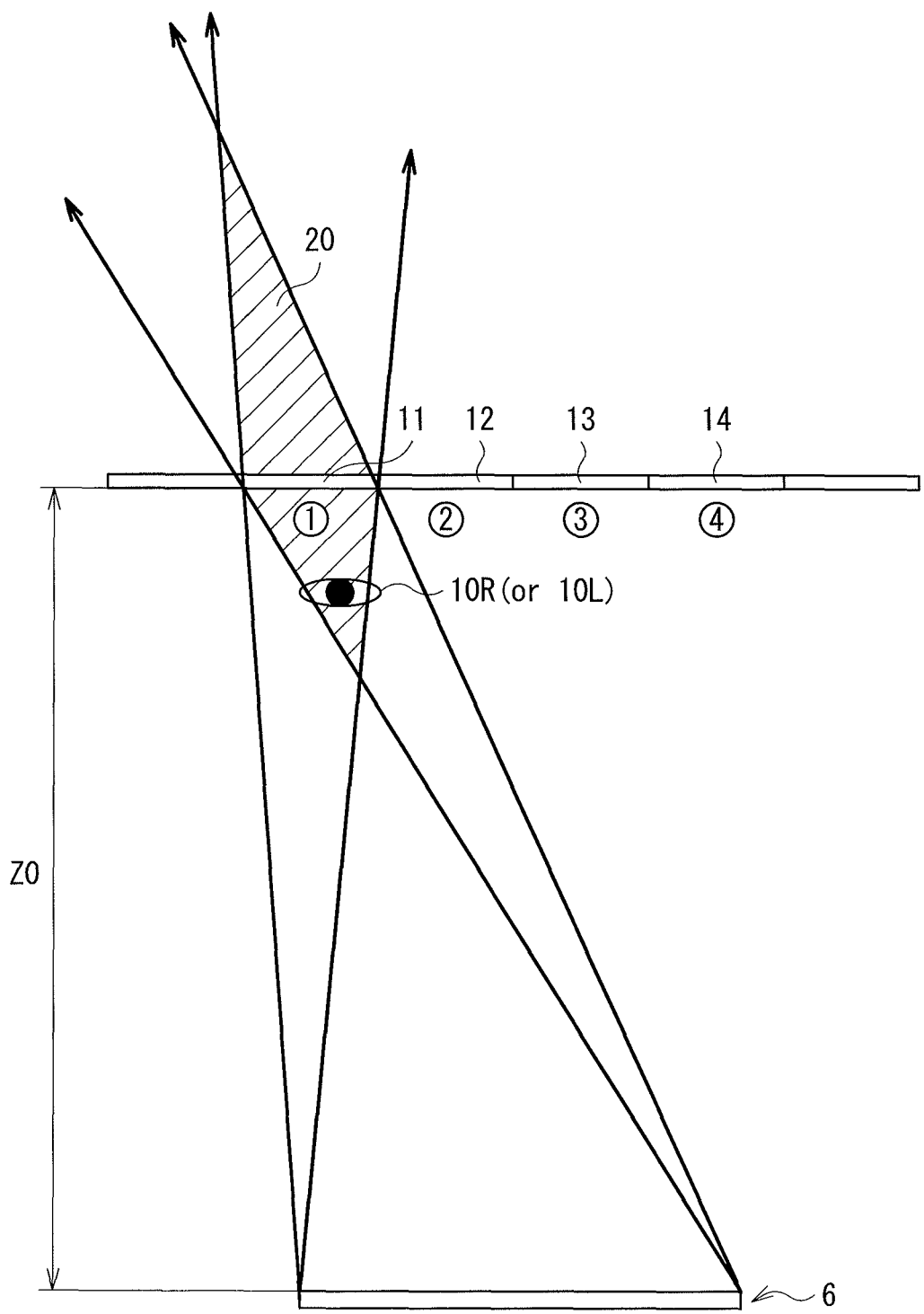
FIG. 6 is an explanatory diagram of viewable pixels in the case where the view position of the viewer is located in a predetermined distance range from the first light-convergence region when stereoscopic display with four perspectives illustrated in FIG. 2 is performed.
Figure 7:
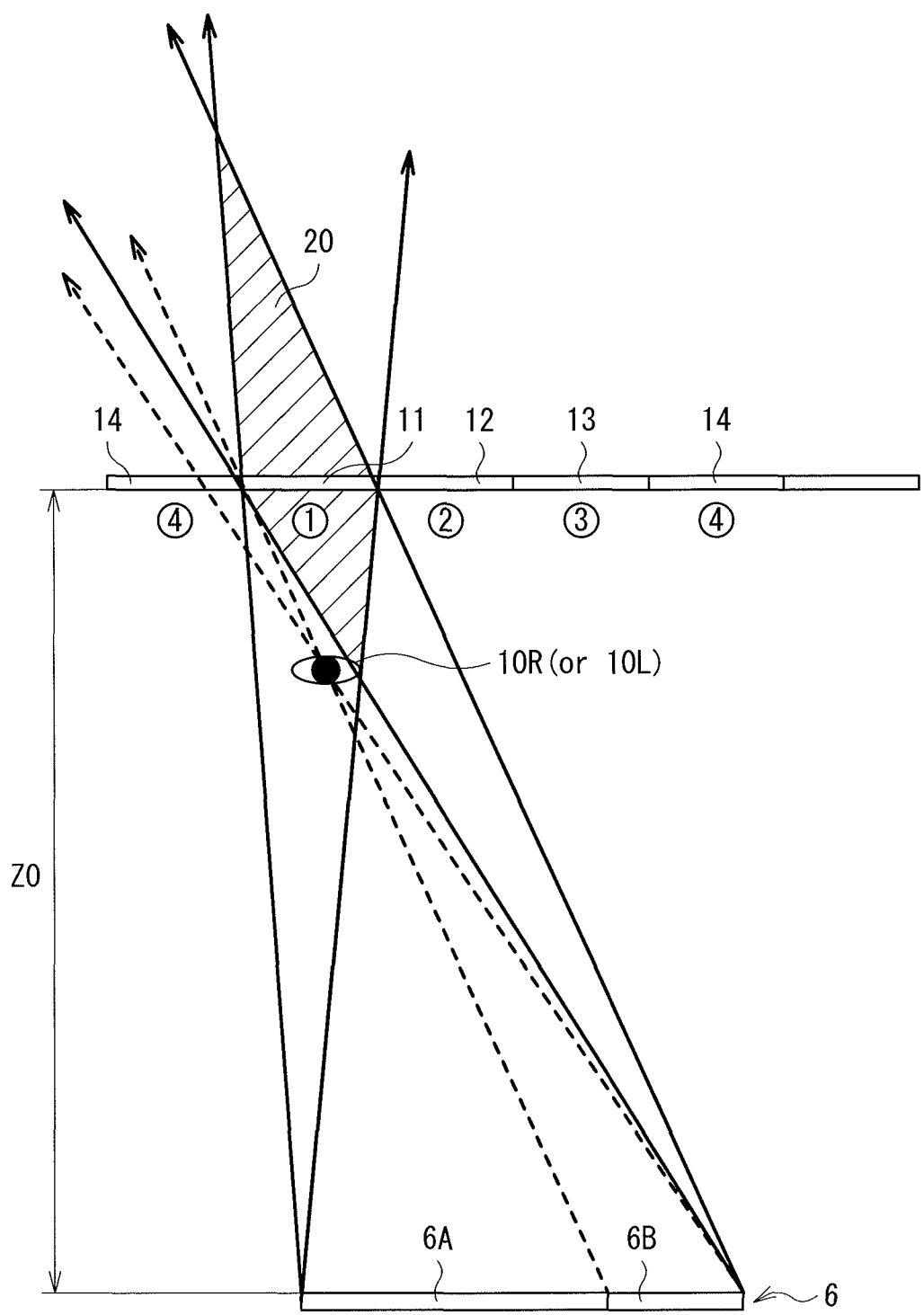
FIG. 7 is an explanatory diagram of viewable pixels in the case where the view position of the viewer is located in a predetermined distance range from the first light-convergence region and a fourth light-convergence region when stereoscopic display with four perspectives illustrated in FIG. 2 is performed.

FIG. 5 illustrates viewable pixels in the case where the view position of the viewer is located in the first light-convergence region 11 when stereoscopic display with four perspectives illustrated in FIG. 2 is performed. Moreover, FIG. 6 illustrates viewable pixels in the case where the view position of the viewer is located in a predetermined distance range from the first light-convergence region 11. It is to be noted that the barrier device 7 is not illustrated in FIGS. 5 and 6. In FIG. 7 and the following drawings, the barrier device 7 is also not illustrated.

As illustrated in FIG. 5, in the case where the view position of the viewer is located in the first light-convergence region 11, all light beams from the first pixels in the entire screen reach the right eye 10R (or the left eye 10L) of the viewer. Moreover, as illustrated in FIG. 6, in the case where the view position is located in a predetermined region 20 within a predetermined distance range from the first light-convergence region 11, all light beams from the first pixels in the entire screen reach the right eye 10R (or the left eye 10L) of the viewer.

FIG. 7 illustrates viewable pixels in the case where the view position of the viewer is located out of the predetermined region 20 in FIG. 6, but in a predetermined distance range from the first light-convergence region 11 and the fourth light-convergence region 14. In this case, light beams from the first pixels in a first display region 6A of the display section 6 and light beams from the fourth pixels in a second display region 6B reach the right eye 10R (or the left eye 10L) of the viewer. In other words, in this case, the right eye 10R (or the left eye 10L) of the viewer views not only light beams from the first pixels (the first perspective image) but also light beams from the fourth pixels (the fourth perspective image).

Viewable pixels (a perspective image) in the case where, as illustrated in FIG. 7, the view position of the viewer is located out of the predetermined region 20 are determined by analyzing which light-convergence regions light beams having reached an eye are supposed to reach.

Figure 8:
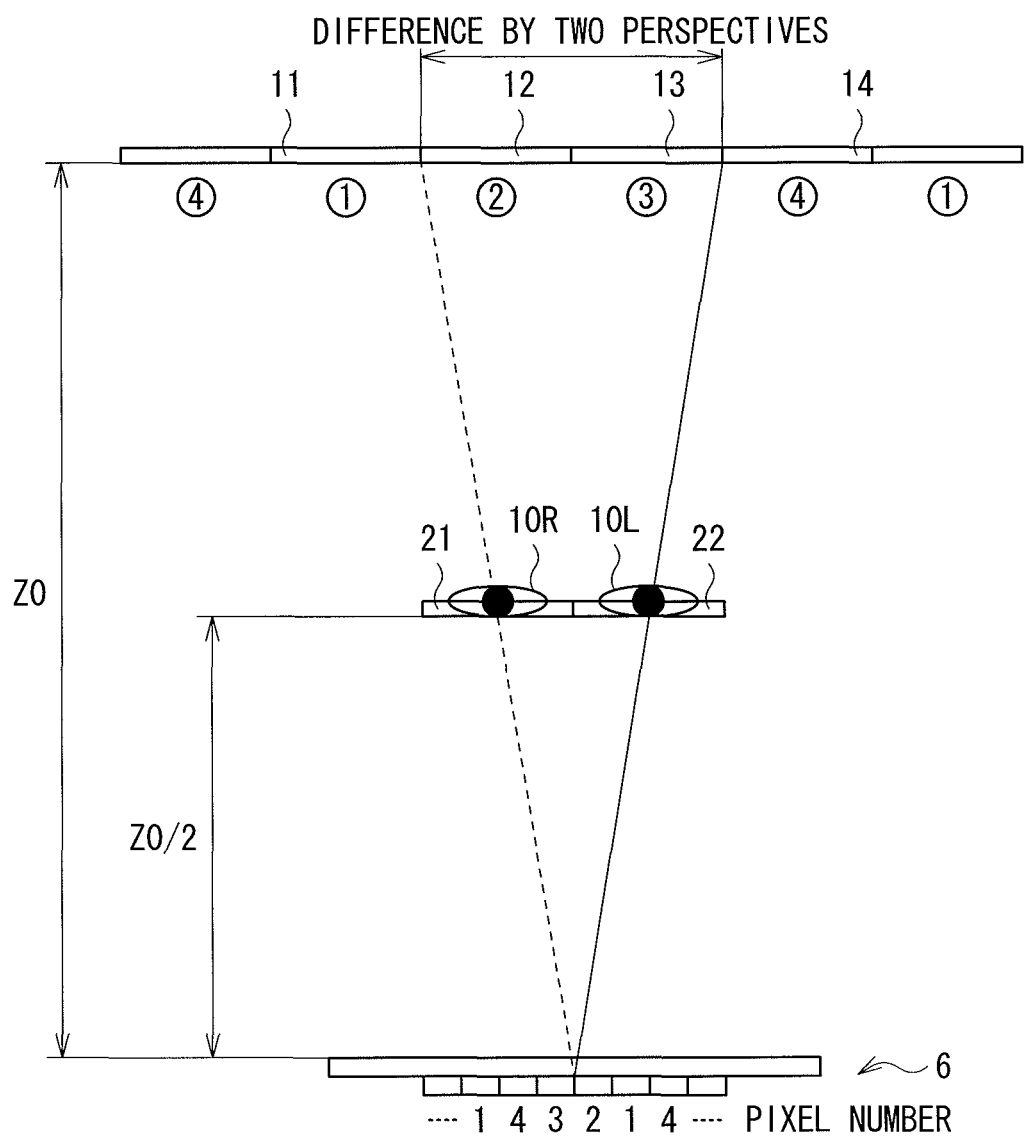
FIG. 8 is a first explanatory diagram of viewable pixels in the case where the view position of the viewer is located at a distance Z0/2 equal to a half of a preferred viewing distance (a second distance Z0) with four perspectives when stereoscopic display with four perspectives illustrated in FIG. 2 is performed.
Figure 9:
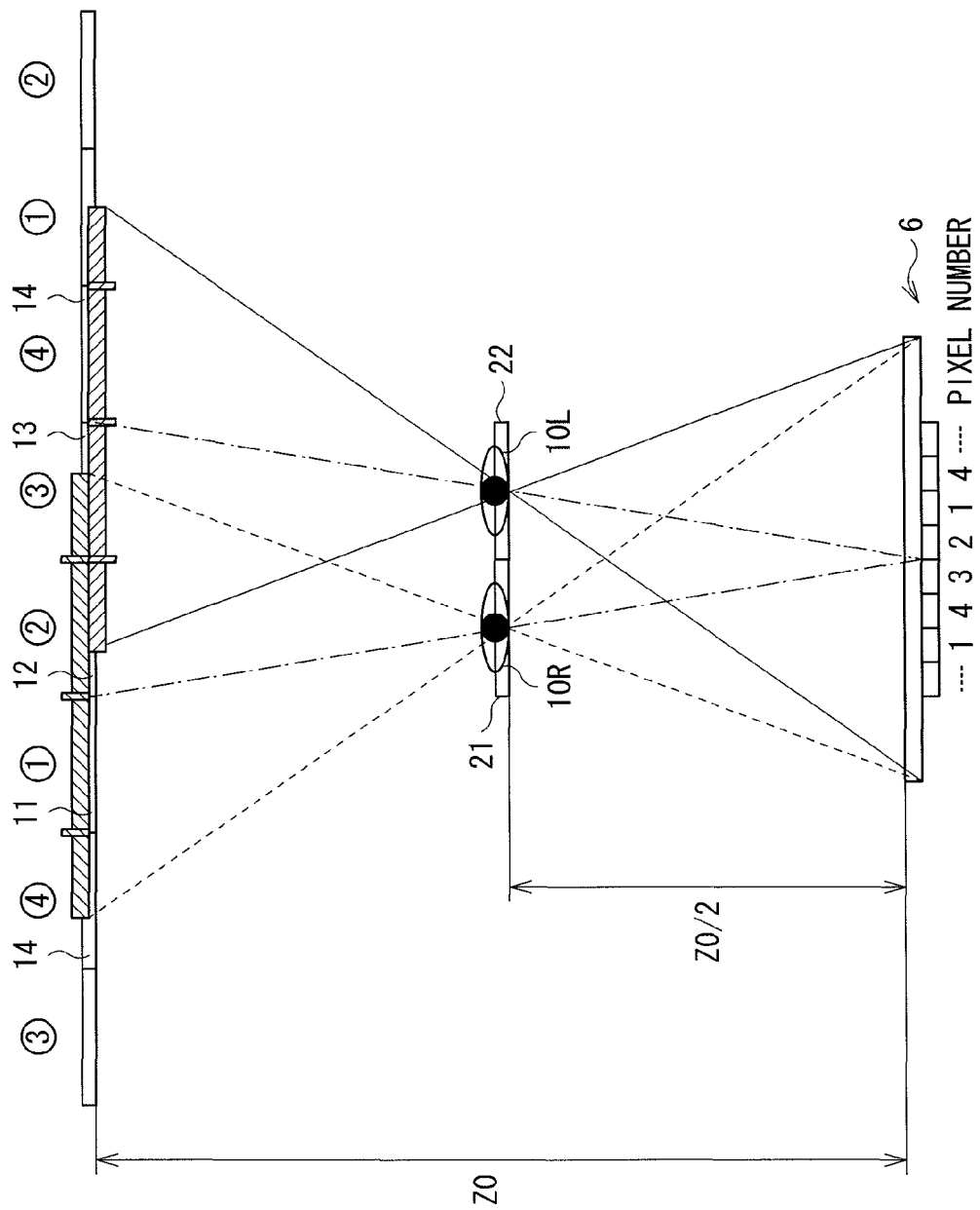
FIG. 9 is a second explanatory diagram of viewable pixels in the case where the view position of the viewer is located at the distance Z0/2 equal to a half of the preferred viewing distance (the second distance Z0) with four perspectives when stereoscopic display with four perspectives illustrated in FIG. 2 is performed.

FIGS. 8 and 9 illustrate viewable pixels in the case where the view position of the viewer is located at a distance (a first distance Z0/2) equal to a half of the preferred viewing distance (the second distance Z0) with four perspectives. The right eye 10R is located in a first region 21 at the first distance Z0/2, and the left eye 10L is located in a second region 22 at the first distance Z0/2. The width of the first region 21 and the width of the second region 22 each are equal to the pupillary distance E (typically 65 mm).

In the case where the view position is located at the first distance Z0/2, as illustrated in FIG. 8, pixels (perspective images) viewed by the right eye 10R and the left eye 10L of the viewer are different (shifted) by two perspectives from those in the case where the view position is located on the preferred viewing distance (the second distance Z0) in design. Moreover, as illustrated in FIG. 9, light beams from the first to fourth pixels (the first to fourth perspective images) reach each of the right eye 10R and the left eye 10L.

Figure 10:
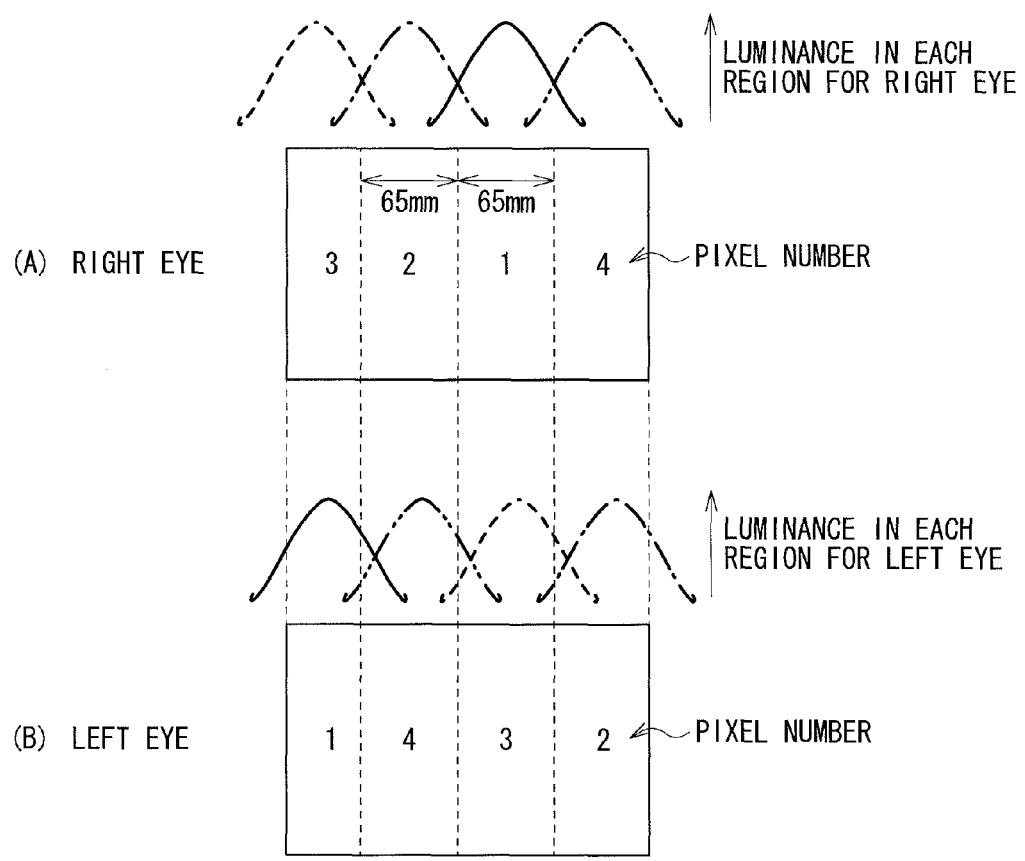
FIG. 10 is an explanatory diagram, where a part (A) illustrates pixel numbers viewable by a right eye and a luminance distribution in a viewing state illustrated in FIG. 9, and a part (B) illustrates pixel numbers viewable by a left eye and a luminance distribution in the viewing state illustrated in FIG. 9.

A part (A) in FIG. 10 illustrates pixel numbers viewable by the right eye 10R and a luminance distribution in a viewing state illustrated in FIG. 9. A part (B) in FIG. 10 illustrates pixel numbers viewable by the left eye 10L and a luminance distribution in the viewing state illustrated in FIG. 9. In the viewing state illustrated in FIG. 9, the right eye 10R and the left eye 10L view pixels (perspective images) different from one of four regions to another in the display section 6. The width of each of the four regions is equal to the pupillary distance E (typically 65 mm) More specifically, as illustrated in the part (A) in FIG. 10, the right eye 10R views the third pixel (the third perspective image), the second pixel (the second perspective image), the first pixel (the first perspective image), and the fourth pixel (the fourth perspective image) in order from an end of the display screen. Moreover, as illustrated in the part (B) in FIG. 10, the left eye 10L views the first pixel (the first perspective image), the fourth pixel (the fourth perspective image), the third pixel (the third perspective image), and the second pixel (the second perspective image) in order from the end of the display screen.

[Optimized Stereoscopic Display Method in the Case where View Position is Located at First Distance Z0/2]

Next, referring to FIGS. 11 and 12, an optimized stereoscopic display method in the case where the view position is located at the first distance Z0/2 will be described below. As can be understood from the above description referring to FIGS. 8 to 10, in the case where the view position is located at the first distance Z0/2, proper stereoscopic vision is not achieved while four perspective images, i.e., the first to fourth perspective images are displayed on the display section 6. Therefore, in the embodiment, in the case where the view position is located at the first distance Z0/2, the display control section 4 controls the display section 6 to display two perspective images, i.e., a right-eye image and a left-eye image instead of the first to fourth perspective images.

Figure 11:
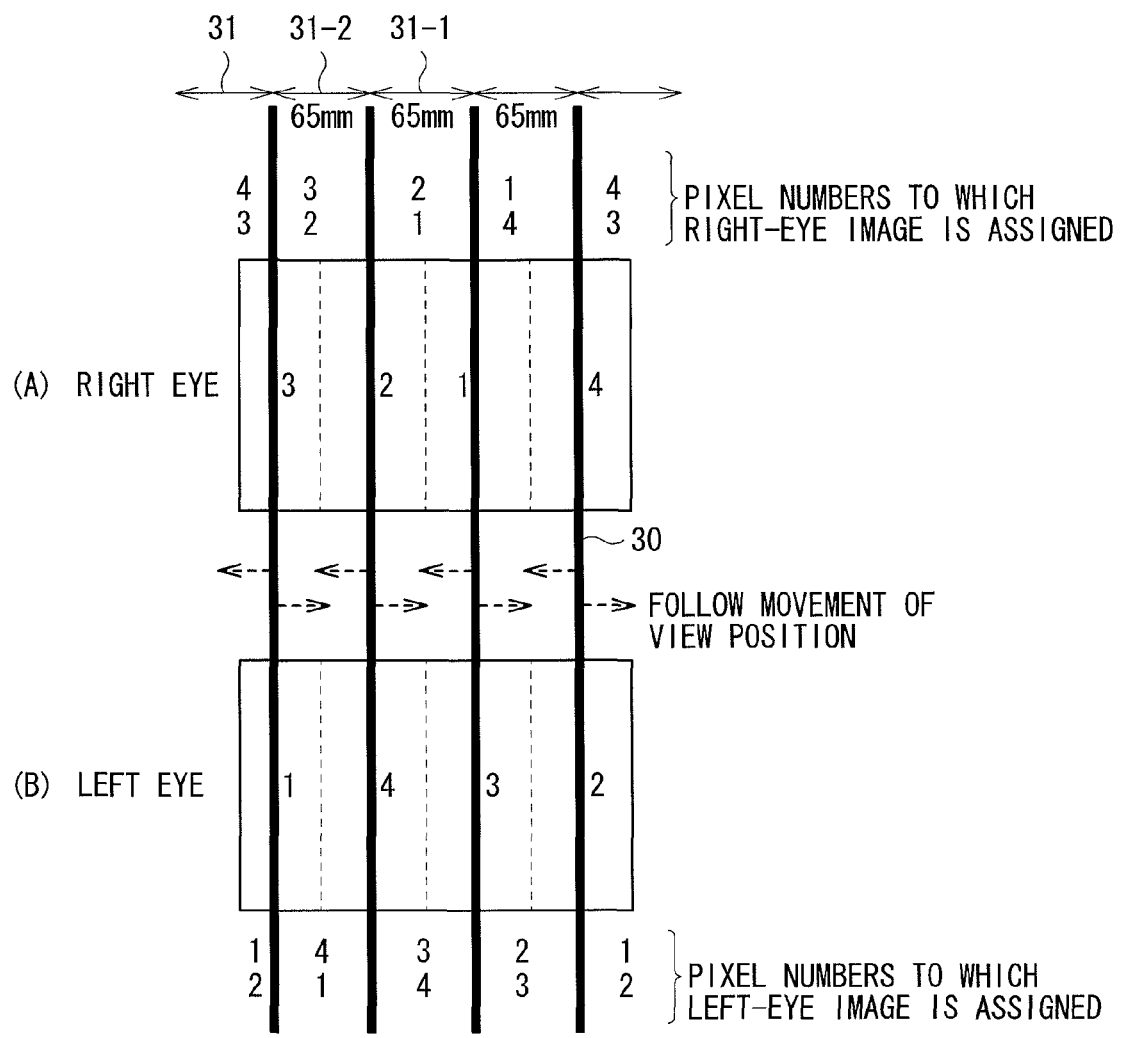
FIG. 11 is an explanatory diagram, where a part (A) illustrates a correspondence relationship between a plurality of sub-regions configured to allow stereoscopic display with two perspectives at the distance Z0/2 in a configuration where stereoscopic display with four perspectives is achievable at the distance Z0 and pixel numbers to which a right-eye image is assigned in each of the sub-regions, and a part (B) illustrates a correspondence relationship between a plurality of sub-regions configured in a manner similar to the case of the part (A) and pixel numbers to which a left-eye image is assigned in each of the sub-regions.

A part (A) in FIG. 11 illustrates a correspondence relationship between a plurality of sub-regions 31 configured to allow stereoscopic display with two perspectives at the first distance Z0/2 in a configuration where stereoscopic display with four perspectives is achievable at the second distance Z0 (refer to FIG. 2) and pixel numbers to which the right-eye image is assigned in each of the sub-regions 31. A part (B) in FIG. 11 illustrates a correspondence relationship between a plurality of sub-regions 31 configured in a manner similar to the case of the part (A) in FIG. 11 and pixel numbers to which the left-eye image is assigned in each of the sub-regions 31.

In the case where the view position of the viewer is located at the first distance Z0/2, the display control section 4 performs display control on the first to fourth pixels in each of the sub-regions 31 (refer to FIG. 11) of the display section 6, independently, thereby to vary the correspondence relationship between the first to fourth pixels and the perspective images (the right-eye image and the left-eye image) for each of the sub-regions 31. In this case, the display control section 4 assigns the right-eye image and the left-eye image to the first to fourth pixels in each of the sub-regions 31, and in the case where the view position of the viewer is located at the first distance $Z0/2$, the display control section 4 assigns the right-eye image to pixels which are viewable from the position of the right eye 10R and correspond to first to fourth light-convergence regions 11 to 14, and assigns the left-eye image to pixels which are viewable from the position of the left eye 10L and correspond to the first to fourth light-convergence regions 11 to 14. In the display section 6, each sub-region includes first pixels to fourth pixels. The display control section 4 assigns the right-eye image to two successive (next to each other or "adjacent") pixels of the first pixel to the fourth pixel and assigns the left-eye image to other two successive (adjacent) pixels of the first pixel to the fourth pixels, in each sub-region. Moreover, a combination of the two (adjacent) pixels to which the right-eye image is assigned and a combination of the other two (adjacent) pixels to which the left-eye image is assigned vary from one sub-region to another.

More specifically, as illustrated in FIG. 11, for example, in a first sub-region 31-1, the display control section 4 assigns the right-eye image to the first and second pixels, and assigns the left-eye image to the third and fourth pixels. Moreover, in a second sub-region 31-2 adjacent to the first sub-region 31-1, the display control section 4 assigns the right-eye image to the second and third pixels, and assigns the left-eye image to the first and fourth pixels.

Moreover, the display control section 4 performs control to move positions in a horizontal direction of respective sub-regions (borders 30 between a plurality of sub-regions 31) in response to movement in a horizontal direction of the view position of the viewer.

Figure 12:
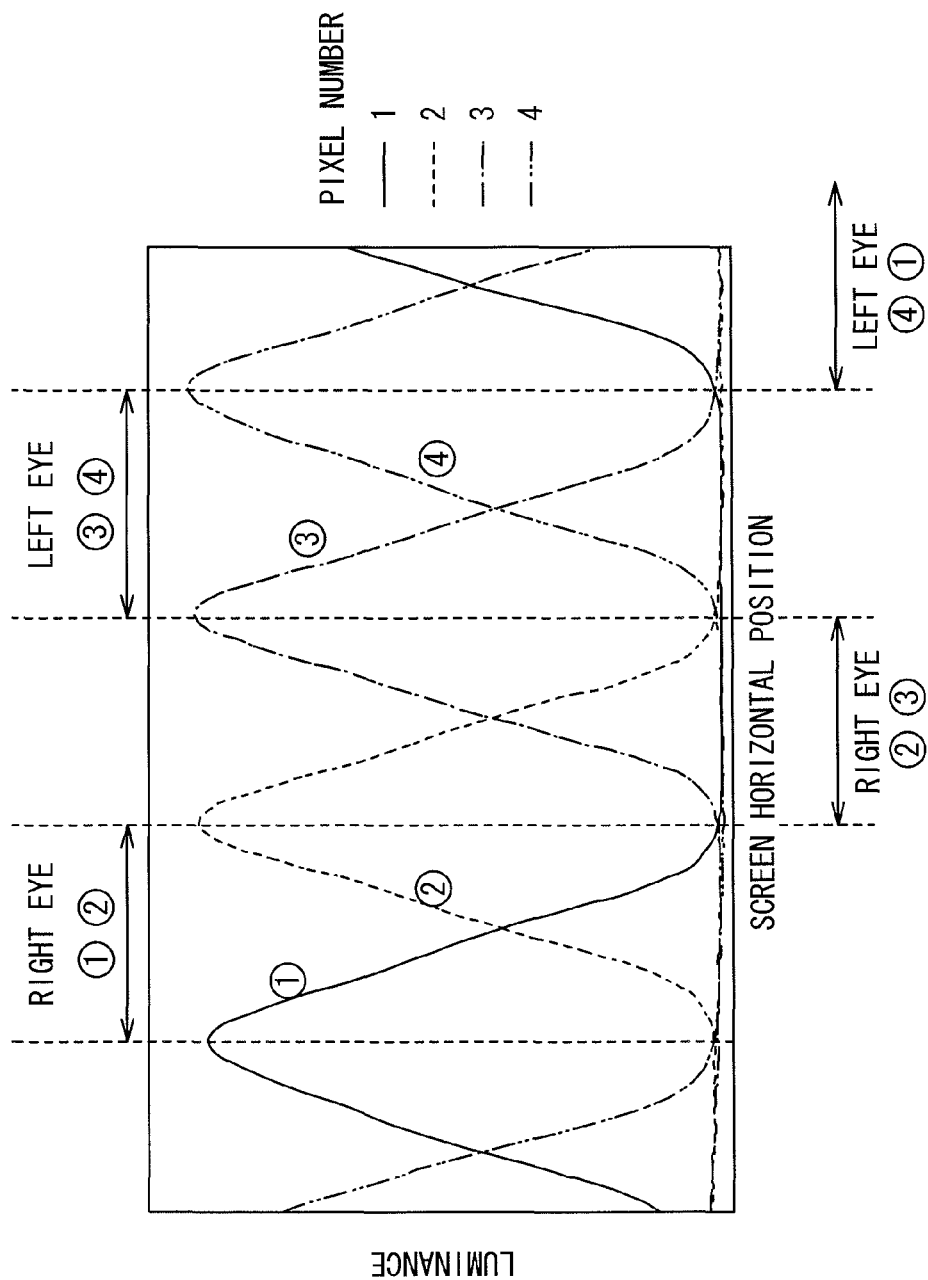
FIG. 12 is an explanatory diagram illustrating a luminance distribution of each pixel in two adjacent sub-regions in the case where stereoscopic display illustrated in FIG. 11 is performed.

FIG. 12 schematically illustrates a luminance distribution of each pixel in two adjacent sub-regions 31-1 and 31-2 in the case where stereoscopic display as illustrated in the parts (A) and (B) in FIG. 11 is performed. In the case where the view position of the viewer is located at the first distance $Z0/2$, the display control section 4 performs display control to allow luminance of the first pixel and the third pixel to be the lowest relatively with respect to that of the second pixel when a boundary portion between the first sub-region 31-1 and the second sub-region 31-2 is viewed from the position of the right eye 10R and to allow luminance of the first pixel and the third pixel to be the lowest relatively with respect to that of the fourth pixel when the boundary portion is viewed from the position of the left eye 10L.

First Modification

Figure 13:
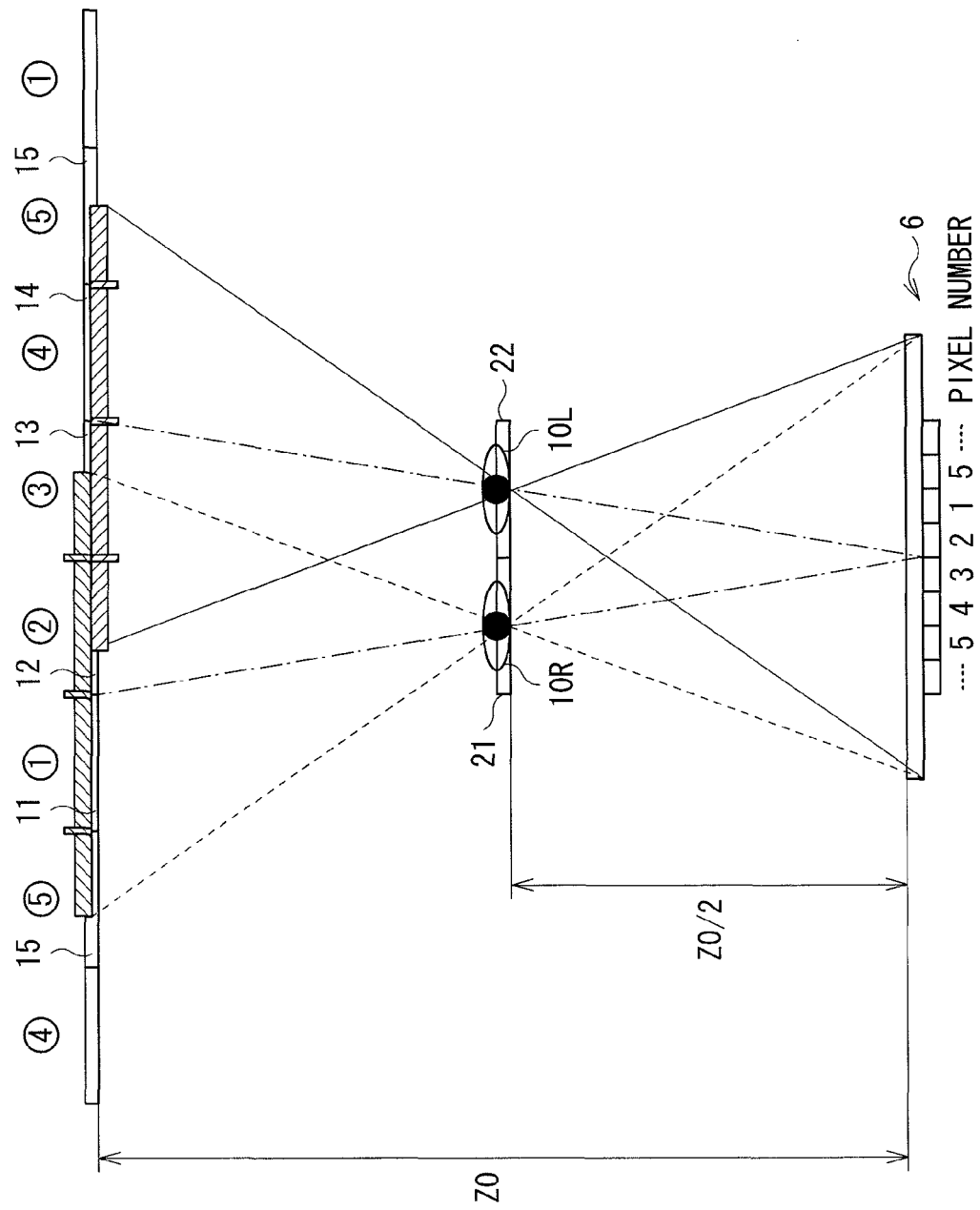
FIG. 13 is an explanatory diagram of viewable pixels in the case where the view position of the viewer is located at a distance Z0/2 equal to a half of a preferred viewing distance with five perspectives when stereoscopic display with five perspectives is performed.
Figure 14:
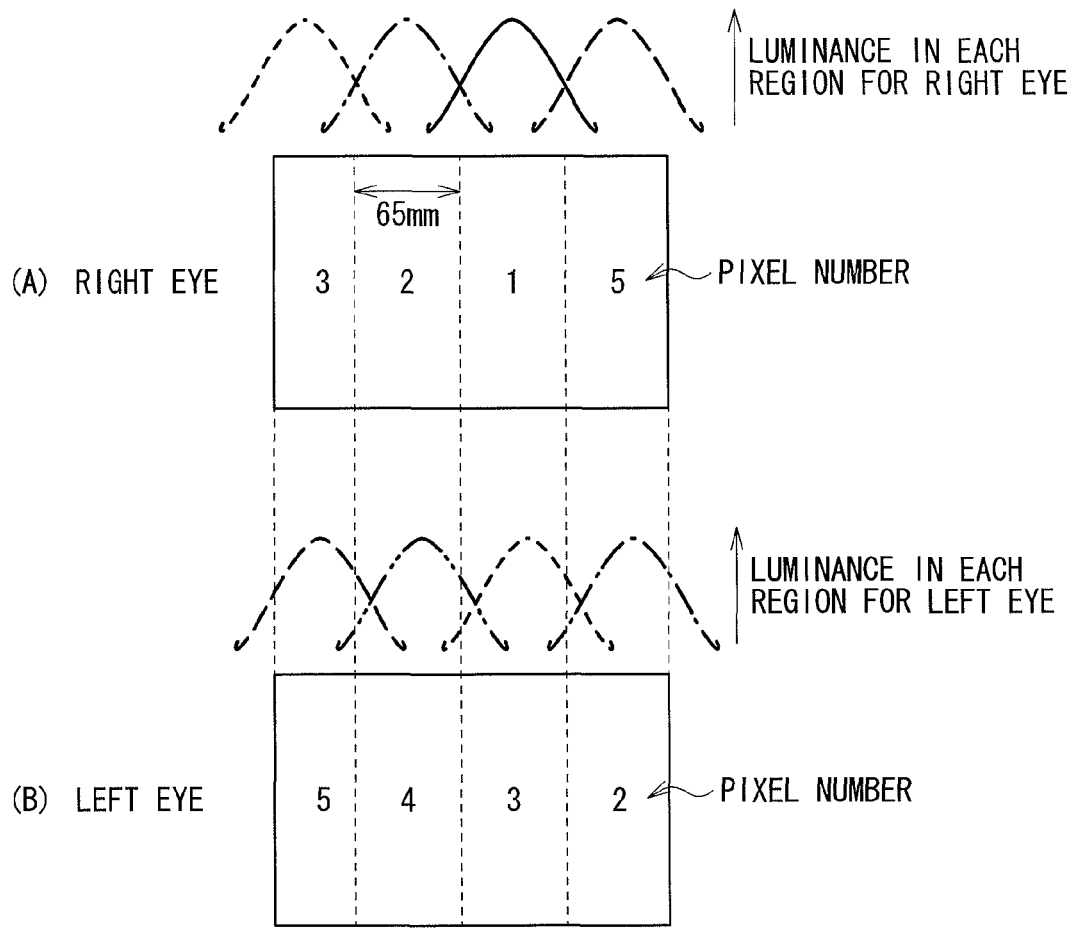
FIG. 14 is an explanatory diagram, where a part (A) illustrates pixel numbers viewable by a right eye and a luminance distribution in a viewing state illustrated in FIG. 13, and a part (B) illustrates pixel numbers viewable by a left eye and a luminance distribution in the viewing state illustrated in FIG. 13.
Figure 15:
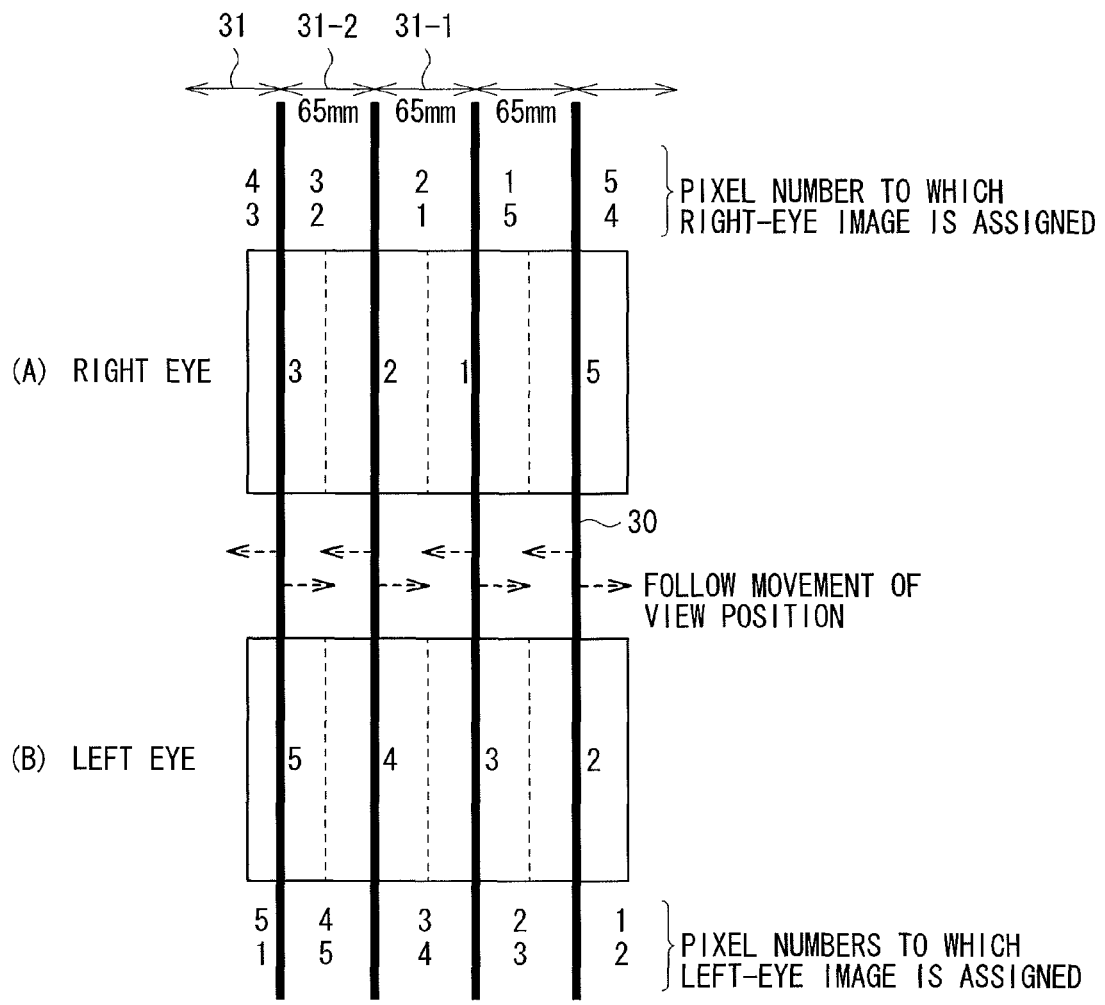
FIG. 15 is an explanatory diagram, where a part (A) illustrates a correspondence relationship between a plurality of sub-regions configured to allow stereoscopic display with two perspectives at the distance Z0/2 in a configuration where stereoscopic display with five perspectives is achievable at the distance Z0 and pixel numbers to which a right-eye image is assigned in each of the sub-regions, and a part (B) illustrates a correspondence relationship between a plurality of sub-regions configured in a manner similar to the case of the part (A) and pixel numbers to which a left-eye image is assigned in each of the sub-regions.

In the above description, the case of stereoscopic display with four perspectives is described as an example; however, the display according to the embodiment is applicable to the case where stereoscopic display with five or more perspectives is performed. FIGS. 13 to 15 illustrate an example in the case where stereoscopic display with five perspectives is performed. In this case, in accordance with five perspectives, first to fifth numbers are assigned to a plurality of pixels (or sub-pixels) of the display section 6. In the case where the view position of the viewer is located at a preferred viewing distance (the second distance $Z0$) with five perspectives, the display control section 4 assigns first to fifth perspective images as a plurality of perspective images to first to fifth pixels in the entire screen of the display section 6, and displays the perspective images.

FIG. 13 illustrates viewable pixels in the case where the view position of the viewer is located at a distance (the first distance $Z0/2$) equal to a half of the preferred viewing distance (the second distance $Z0$) with five perspectives when stereoscopic display with five perspectives is performed. The right eye 10R is located in the first region 21 at the first distance $Z0/2$, and the left eye 10L is located in the second region 22 at the first distance $Z0/2$. The width of each of the first region 21 and the second region 22 is equal to the pupillary distance E (typically 65 mm).

In the case where the view position is located at the first distance $Z0/2$, as illustrated in FIG. 13, light beams from the first to fifth pixels (first to fifth perspective images) reach the right eye 10R and the left eye 10L.

A part (A) in FIG. 14 illustrates pixel numbers viewable by the right eye 10R and a luminance distribution in a viewing state illustrated in FIG. 13. A part (B) in FIG. 14 illustrates pixel numbers viewable by the left eye 10L and a luminance distribution in the viewing state illustrated in FIG. 13. In the viewing state illustrated in FIG. 13, the right eye 10R and the left eye 10L view pixels (perspective images) different from one of the four regions to another in the display section 6. The width of each of the four regions is equal to the pupillary distance E (typically 65 mm) More specifically, as illustrated in the part (A) in FIG. 14, the right eye 10R views the third pixel (the third perspective image), the second pixel (the second perspective image), the first pixel (the first perspective image), and the fifth pixel (the fifth perspective image) in order from an end of the display screen. Moreover, as illustrated in the part (B) in FIG. 14, the left eye 10L views the fifth pixel (the fifth perspective image), the fourth pixel (the fourth perspective image), the third pixel (the third perspective image), and the second pixel (the second perspective image) in order from the end of the display screen.

As can be understood from the above description referring to FIGS. 13 and 14, in the case where the view position is located at the first distance $Z0/2$, proper stereoscopic vision is not achieved while five perspective images, i.e., the first to fifth perspective images are displayed on the display section 6. Therefore, in the case where the view position is located at the first distance $Z0/2$, the display control section 4 controls the display section 6 to display two perspective images, i.e., the right-eye image and the left-eye image instead of the first to fifth perspective images.

A part (A) in FIG. 15 illustrates a correspondence relationship between a plurality of sub-regions 31 configured to allow stereoscopic display with two perspectives at the first distance $Z0/2$ in a configuration where stereoscopic display with five perspectives is achievable at the second distance $Z0$ and pixel numbers to which the right-eye image is assigned in each of the sub-regions 31. A part (B) in FIG. 15 illustrates a correspondence relationship between a plurality of sub-regions 31 configured in a manner similar to the case of the part (A) in FIG. 15 and pixel numbers to which the left-eye image is assigned in each of the sub-regions 31.

In the case where the view position of the viewer is located at the first distance $Z0/2$, the display control section 4 performs display control on the first to fifth pixels in each of the sub-regions 31 of the display section 6, independently, thereby to vary a correspondence relationship between the first to fifth pixels and the perspective images (the right-eye image and the left-eye image) for each of the sub-regions 31. In this case, the display control section 4 assigns the right-eye image and the left-eye image to the first to fifth pixels in each of the sub-regions 31, and in the case where the view position of the viewer is located at the first distance $Z0/2$, the display control section 4 assigns the right-eye image to pixels which are viewable from the position of the right eye 10R and correspond to first to fifth light-convergence regions 11 to 15, and assigns the left-eye image to pixels which are viewable from the position of the left eye 10L and correspond to the first to fifth light-convergence regions 11 to 15. In the display section 6, each sub-region includes first pixels to fifth pixels. The display control section 4 assigns the right-eye image to two successive (adjacent) pixels of the first pixel to the fifth pixel and assigns the left-eye image to other two successive (adjacent) pixels of the first pixel to the fifth pixel, in each sub-region. Moreover, a combination of the two (adjacent) pixels to which the right-eye image is assigned and a combination of the other two (adjacent) pixels to which the left-eye image is assigned vary from one sub-region to another. A specific method of assigning the images to the pixels is similar to that in the case of the above-described stereoscopic display with four perspectives.

Second Modification

A second modification relates to a method of reducing moiré (luminance non-uniformity) occurring when optimized stereoscopic display is performed in the case where the view position is located at the first distance Z0/2 as illustrated in FIGS. 11 and 12.

Figure 16:
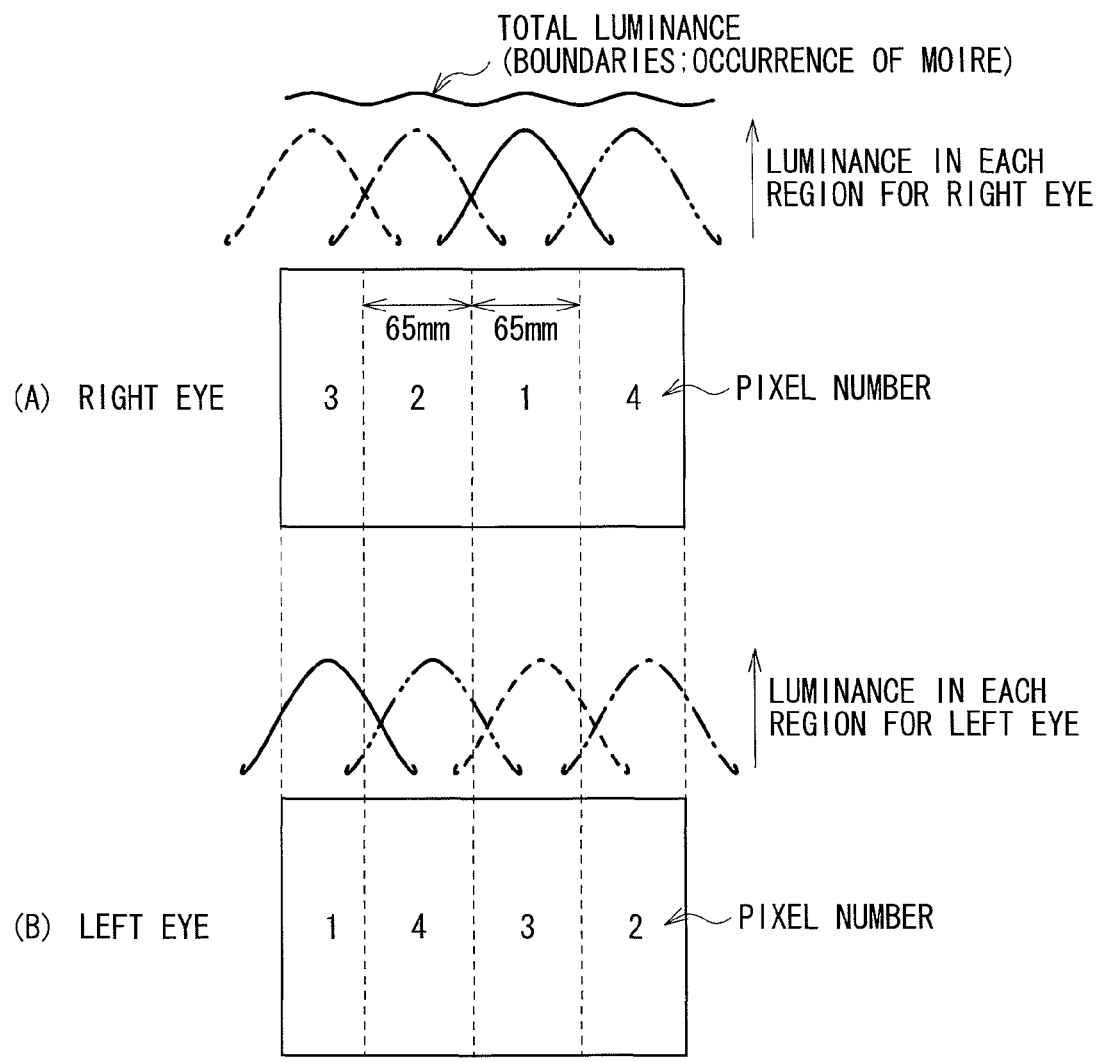
FIG. 16 is an explanatory diagram of occurrence of moiré at the distance Z0/2, where a part (A) illustrates pixel numbers viewable by a right eye and a luminance distribution in the viewing state illustrated in FIG. 9, and a part (B) illustrates pixel numbers viewable by a left eye and a luminance distribution in the viewing state illustrated in FIG. 9.

Parts (A) and (B) in FIG. 16 illustrate correspondence relationships between pixel numbers viewable by the right eye 10R and the left eye 10L and luminance distributions at the first distance Z0/2, as in the case of the parts (A) and (B) in FIG. 10. As illustrated in FIG. 16, a decrease in luminance in a composite luminance distribution is caused in boundary portions between different pixels, and the decrease is observed as moiré. Therefore, in this modification, the display control section 4 performs control to adjust a luminance level of one or both of two pixels in each of sub-regions (refer to FIG. 11) to uniformize luminance in each of the sub-regions. It is to be noted that the two pixels here mean two pixels in each of the right-eye image and the left-eye image. In other words, the two pixels mean two pixels to which the right-eye image is assigned as well as other two pixels to which the left-eye image is assigned.

Figure 17A:
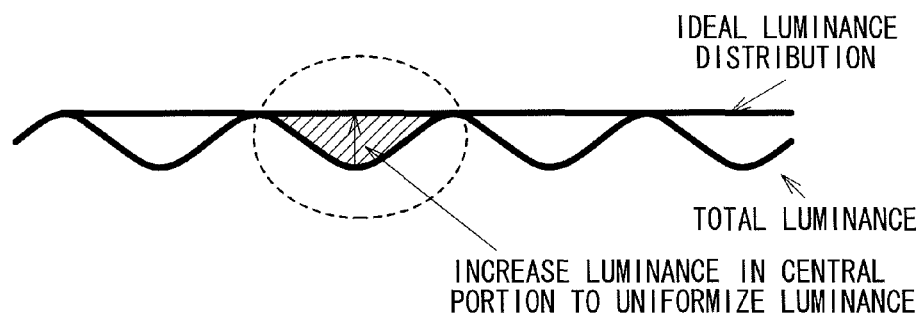
FIGS. 17A and 17B are explanatory diagrams illustrating first and second adjustment methods adopted to suppress occurrence of moiré, respectively.
Figure 18:
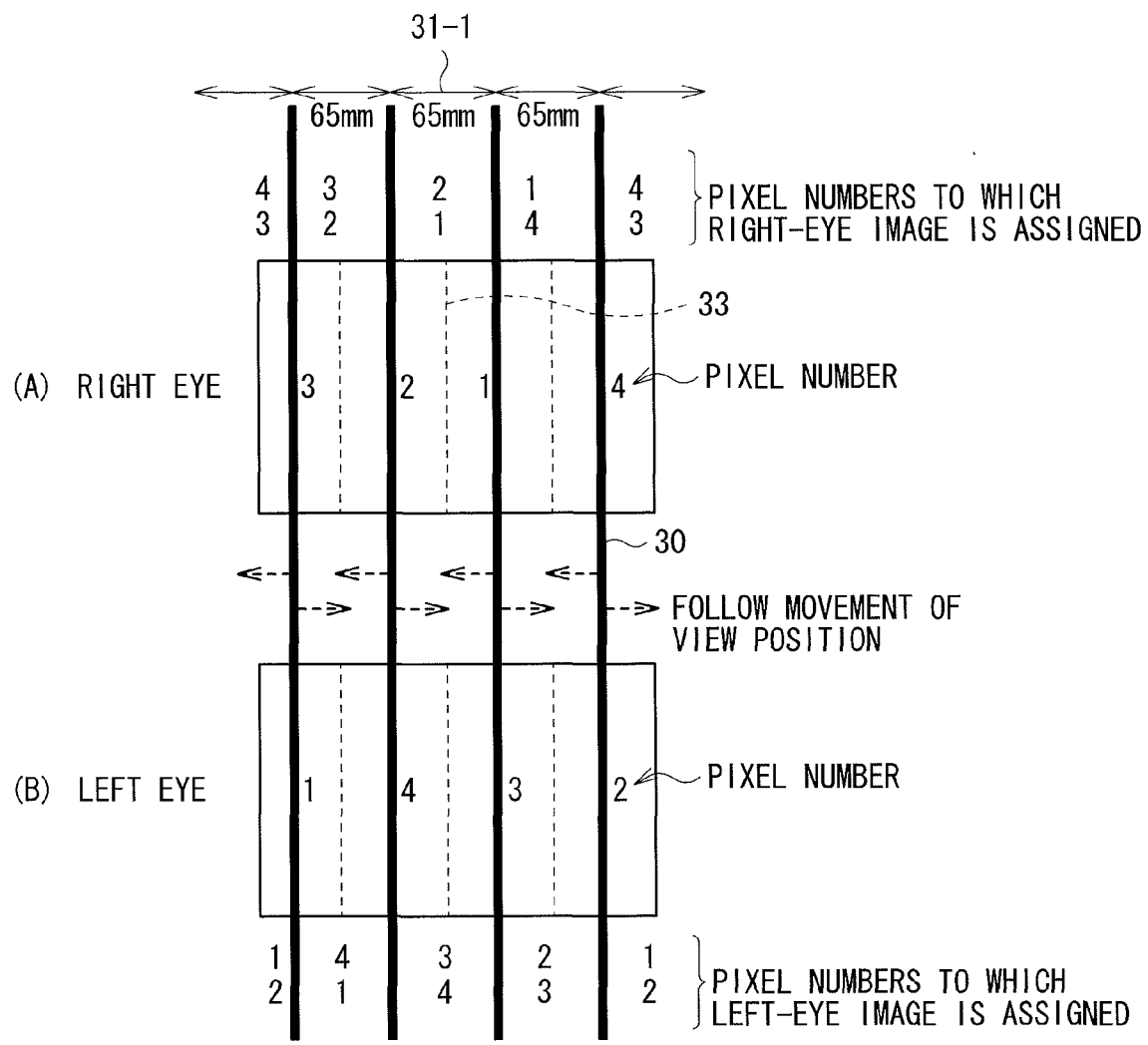
FIG. 18 is an explanatory diagram, where a part (A) illustrates a correspondence relationship between a plurality of sub-regions and pixel numbers to which a right-eye image is assigned in each of the sub-regions, and a part (B) illustrates a correspondence relationship between the plurality of sub-regions and pixel numbers to which a left-eye image is assigned in each of the sub-regions.

FIG. 17A illustrate a first adjustment method adopted to suppress occurrence of moiré. In the first adjustment method, a luminance level of one or both of two pixels in each of the sub-regions is adjusted to be increased. An increase in the luminance level is adjusted to allow the luminance level in a central portion of each of the sub-regions to be higher than that in a peripheral portion thereof. As illustrated in a part (A) in FIG. 18, for example, in the first sub-region 31-1, adjustment is performed to increase a luminance level of one or both of a first pixel and a second pixel to which, for example, the right-eye image is assigned. Then, in the first sub-region 31-1, an increased amount is adjusted to allow a luminance level in a central portion 33 to be higher than that in a peripheral portion.

Figure 17B:
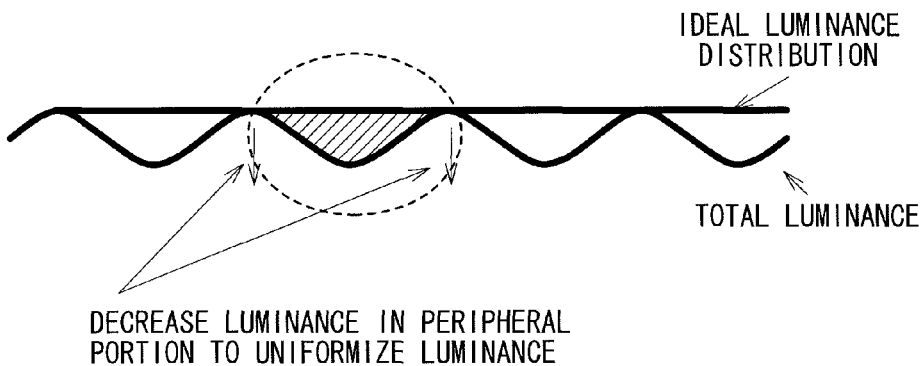

FIG. 17B illustrates a second adjustment method adopted to suppress occurrence of moiré. In the second adjustment method, a luminance level of one or both of two pixels in each of the sub-regions is adjusted to be decreased. A decrease in the luminance level is adjusted to allow a luminance level in a peripheral portion of each of the sub-regions to be higher than that in a central portion thereof. As illustrated in a part (A) in FIG. 18, for example, in the first sub-region 31-1, adjustment is performed to decrease the luminance level of one or both of the first pixel and the second pixel to which, for example, the right-eye image is assigned. Then, in the first sub-region 31-1, a decreased amount is adjusted to allow the luminance level in the peripheral portion to be higher than that in the central portion 33.

Figure 19:
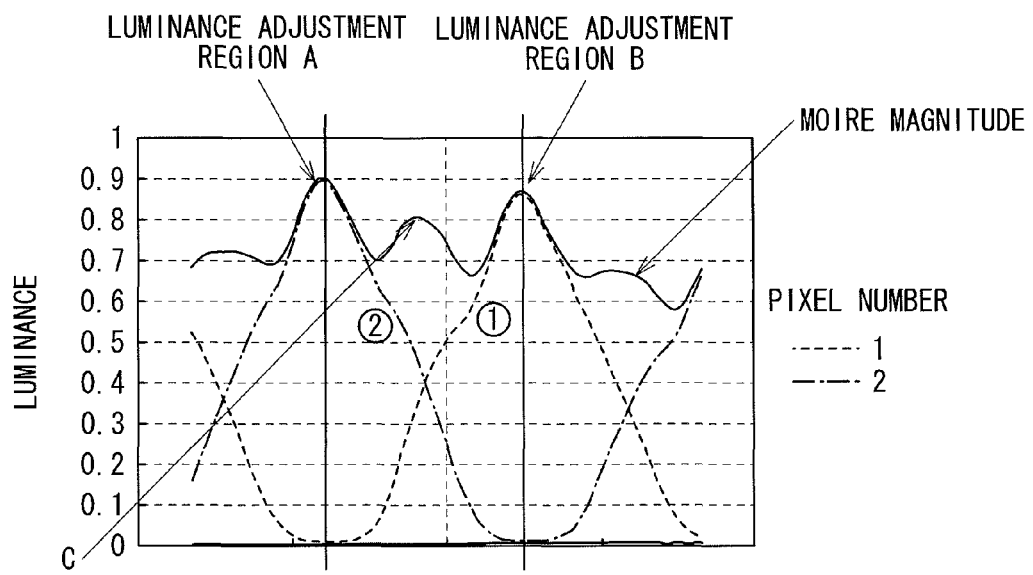
FIG. 19 is an explanatory diagram illustrating the second adjustment method adopted to suppress occurrence of moiré.

A more specific example of the second adjustment method will be described referring to FIG. 19. FIG. 19 illustrates an example of a luminance distribution of a first pixel and a second pixel in a region corresponding to the first sub-region 31-1 illustrated in the part (A) in FIG. 18. FIG. 19 also illustrates a moiré state. In FIG. 19, when assuming that white display is performed as a whole, there is a generation of luminance non-uniformity of 30% (0.9/0.68). Typically, luminance non-uniformity due to a luminance difference of 20% causes discomfort to the viewer. Therefore, it is necessary to reduce the luminance difference. To reduce moiré to 20% or less, luminance in a region A in FIG. 19 is reduced by up to 8%. A maximum gray-scale number is reduced from 254 gray-scale levels to 233 gray-scale levels to gradually reduce a luminance adjustment width toward 0 to be close to a region C, and in a similar manner, luminance in a region B is reduced by up to 5%, and a maximum gray-scale number is reduced from 254 gray-scale levels to 242 gray-scale levels. Thus, moiré is allowed to be reduced below a perceptible level for the viewer.

[Effects]

As described above, in the display according to the embodiment, the number of perspective images assigned to the first to nth pixels and a correspondence relationship between the first to nth pixels and perspective images are varied according to the view position of the viewer; therefore, optimum stereoscopic display according to the view position is allowed to be performed. The display according to the embodiment makes it possible to optimize display thereof only by image processing. Thus, it is possible to readily work the display according to the embodiment without making movement or the like of the barrier device 7. Moreover, in the case where the view position of the viewer is moved in a horizontal direction while the view position of the viewer is located at the first distance Z0/2, it is only necessary to perform control to move the boundaries 30 between a plurality of sub-regions 31. Thus, it is possible to readily work the display according to the embodiment. Moreover, optimum display in consideration of the luminance distribution as illustrated in FIG. 12 is performed; therefore, display with less crosstalk is allowed to be performed. In addition, it makes it possible to establish a state in which image switching from one of a plurality of sub-regions 31 to another is difficult to be recognized; therefore, natural display for the viewer is allowed to be performed.

Moreover, in related art, when a space between a parallax separation structure and a display section is too small, it is necessary to perform glass grinding or the like to reduce the thickness of a glass substrate or the like between the parallax separation structure and the display section, thereby causing difficulty in manufacturing. In the display according to the embodiment, the preferred viewing distance Z0 in design is allowed to be longer; therefore, a load caused by glass grinding is allowed to be reduced. A viewing distance in the case where display with two perspectives is performed in the display is equal to a half of a normal preferred viewing distance Z0 in design. In other words, a preferred viewing distance Z0 in design is allowed to be twice as long as that in a typical stereoscopic display method with two perspectives (refer to FIG. 3).

Other Embodiments

The present application is not limited to the above-described embodiment, and may be variously modified.

For example, it is possible to achieve at least the following configurations from the above-described exemplary embodiment and the modifications of the application.

(1) A display including:
a display section including a plurality of first pixels to a plurality of nth pixels, where n is an integer of 4 or more, and displaying a plurality of perspective images assigned to the first to nth pixels; and
a display control section partitioning the display section into a plurality of sub-regions and performing display control on pixels in each of the sub-regions, independently, thereby to vary a correspondence relationship between the first to nth pixels and the perspective images for each of the sub-regions,
wherein the display control section assigns a first perspective image to two pixels of the first pixel to the nth pixel and assigns a second perspective image to other two pixels of the first pixel to the nth pixel, in each of the sub-regions, and
the display control section adjusts a luminance level of one or both of the two pixels and a luminance level of one or both of the other two pixels in each of the sub-regions.

(2) The display according to (1), wherein the display control section performs adjustment to increase the luminance level of one or both of the two pixels and the luminance of one or both of the other pixels, an amount of the adjustment allowing a luminance level in a central portion of each of the sub-regions to be higher than a luminance level in a peripheral portion thereof (3) The display according to (1), wherein the display control section performs adjustment to decrease the luminance level of one or both of the two pixels and the luminance level of one or both of the other two pixels, an amount of the adjustment allowing a luminance level in a peripheral portion of each of the sub-regions to be higher than a luminance level in a central portion thereof (4) The display according to any one of (1) to (3), wherein the display control section performs adjustment to uniformize the luminance level within each of the sub-regions.

(5) The display according to any one of (1) to (4), further including a detection section detecting a view position of a viewer,
wherein the display control section varies the number of the plurality of perspective images assigned to the first to nth pixels and varies a correspondence relationship between the first to nth pixels and the perspective images, according to the view position of the viewer.

(6) The display according to (5), wherein the display control section performs display control on pixels in each of the sub-regions, independently, when the view position of the viewer is located at a first distance from the display section.

(7) The display according to (6), further including a separation section separating light beams from the first to nth pixels to allow the separated light beams to reach respective first to nth light-convergence regions located at a second distance from the display section,
wherein the display control section assigns first to nth perspective images as the plurality of perspective images to the first to nth pixels in an entire screen of the display section, when the view position of the viewer is located at the second distance.

(8) The display according to (7), wherein the first distance is equal to a half of the second distance.

(9) The display according to any one of (1) to (8), wherein the two pixels are pixels next to each other.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display comprising:
a display section including a plurality of first pixels to a plurality of nth pixels, where n is an integer of 4 or more, and displaying a plurality of perspective images assigned to the first to nth pixels; and
a display control section partitioning the display section into a plurality of sub-regions and performing display control on pixels in each of the sub-regions, independently, thereby to vary a correspondence relationship between the first to nth pixels and the perspective images for each of the sub-regions,
wherein the display control section assigns a first perspective image to two pixels of the first pixel to the nth pixel and assigns a second perspective image to other two pixels of the first pixel to the nth pixel, in each of the sub-regions,
wherein the display control section adjusts a luminance level of one or both of the two pixels and a luminance level of one or both of the other two pixels in each of the sub-regions,
wherein the sub-regions are partitioned at boundaries except for boundaries of pixels,
wherein the sub-region for a right eye is different from that for a left eye,
wherein two kinds of color lights are emitted from two kinds of pixels of the sub-region for the right eye, and another two kinds of color lights are emitted from another two kinds of pixels of the sub-region for the left eye, and
wherein a luminance of at least one pixel of each the sub-region is controlled such that a degree of controlled luminance at approximate center of the sub-region is relatively greater than other area of the sub-region.

2. The display according to claim 1, wherein the display control section performs adjustment to increase the luminance level of one or both of the two pixels and the luminance of one or both of the other pixels, an amount of the adjustment allowing a luminance level in a central portion of each of the sub-regions to be higher than a luminance level in a peripheral portion thereof.

3. The display according to claim 1, wherein the display control section performs adjustment to decrease the luminance level of one or both of the two pixels and the luminance level of one or both of the other two pixels, an amount of the adjustment allowing a luminance level in a peripheral portion of each of the sub-regions to be higher than a luminance level in a central portion thereof.

4. The display according to claim 1, wherein the display control section performs adjustment to uniformize the luminance level within each of the sub-regions.

5. The display according to claim 1, further comprising a detection section detecting a view position of a viewer,
wherein the display control section varies the number of the plurality of perspective images assigned to the first to nth pixels and varies a correspondence relationship between the first to nth pixels and the perspective images, according to the view position of the viewer.

6. The display according to claim 5, wherein the display control section performs display control on pixels in each of the sub-regions, independently, when the view position of the viewer is located at a first distance from the display section.

7. The display according to claim 6, further comprising a separation section separating light beams from the first to nth pixels to allow the separated light beams to reach respective first to nth light-convergence regions located at a second distance from the display section,
    wherein the display control section assigns first to nth perspective images as the plurality of perspective images to the first to nth pixels in an entire screen of the display section, when the view position of the viewer is located at the second distance.

8. The display according to claim 7, wherein the first distance is equal to a half of the second distance.

9. The display according to claim 1, wherein the two pixels are pixels next to each other.

* * * * *